United States Patent
Wang et al.

(10) Patent No.: US 10,749,704 B2
(45) Date of Patent: Aug. 18, 2020

(54) INTELLIGENT TERMINAL REMOTE CONTROLLER-BASED INTERNET-OF-THINGS CONTROL SYSTEM AND CONTROL METHOD

(71) Applicant: Gree Electric Appliances, Inc. of Zhuhai, Zhuhai, Guangdong (CN)

(72) Inventors: Tao Wang, Guangdong (CN); Chunping Yu, Guangdong (CN); Hui Zhang, Guangdong (CN); Bo Liang, Guangdong (CN); Wuzhan Ye, Guangdong (CN); Xianlin Wang, Guangdong (CN); Zhenghua Huang, Guangdong (CN); Yong He, Guangdong (CN); Baoyan Li, Guangdong (CN); Kai Sun, Guangdong (CN); Chunxia Yang, Guangdong (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 294 days.

(21) Appl. No.: 15/751,681

(22) PCT Filed: Jul. 29, 2016

(86) PCT No.: PCT/CN2016/092302
§ 371 (c)(1),
(2) Date: Jul. 5, 2018

(87) PCT Pub. No.: WO2017/024948
PCT Pub. Date: Feb. 16, 2017

(65) Prior Publication Data
US 2018/0367331 A1 Dec. 20, 2018

(30) Foreign Application Priority Data
Aug. 11, 2015 (CN) .......................... 2015 1 0490233

(51) Int. Cl.
*G06F 15/16* (2006.01)
*H04L 12/28* (2006.01)

(52) U.S. Cl.
CPC ........ *H04L 12/2809* (2013.01); *H04L 12/281* (2013.01); *H04L 12/282* (2013.01); *H04L 2012/285* (2013.01); *H04L 2012/2841* (2013.01)

(58) Field of Classification Search
CPC ............................ G08C 17/02; H04L 12/282
See application file for complete search history.

(56) References Cited

U.S. PATENT DOCUMENTS 6,344,817 B1 * 2/2002 Verzulli ................. G08C 19/28
340/12.28
6,577,227 B1 * 6/2003 Kirchlinde ......... G07C 9/00309
340/426.13
(Continued)

FOREIGN PATENT DOCUMENTS

| CN | 103813195 | 5/2014 |
| CN | 103905870 | 7/2014 |

(Continued)

OTHER PUBLICATIONS

Yu et al., CN 104270518 A, English translation provided by Espacenet, priority filing date Sep. 25, 2014 (Year: 2020).*

*Primary Examiner* — Hieu T Hoang
(74) *Attorney, Agent, or Firm* — Brandon V. Zuniga; James R. Gourley; Carstens & Cahoon, LLP

(57) ABSTRACT

An intelligent terminal remote controller-based internet-of-things control system and control method are disclosed. The control system includes at least two household electrical appliance hosts (1) and an intelligent terminal (2), remote controller software is included in the intelligent terminal (2) and in communication with a model database (9) of the intelligent terminal (2), the model database (9) is configured
(Continued)

to store model number information and information of all functions of various household electrical appliance hosts to be controlled, the household electrical appliance host (1) includes an MCU control chip (7) storing model number information of a current household electrical appliance host, and a control system unit (5). The present invention allows invoking a back-end database through software and making recognition and judgment among control subjects, so as to solve the problem that the remote-control functions are different for different electrical appliances of different models.

10 Claims, 2 Drawing Sheets

(56) References Cited

U.S. PATENT DOCUMENTS

| | | | | |
|---|---|---|---|---|
| 9,153,126 | B2* | 10/2015 | Chen | G08C 23/04 |
| 2004/0070491 | A1* | 4/2004 | Huang | G08C 17/02 |
| | | | | 340/10.5 |
| 2005/0096753 | A1* | 5/2005 | Arling | G05B 15/02 |
| | | | | 700/11 |
| 2006/0109138 | A1 | 5/2006 | Chiang | |
| 2007/0080845 | A1* | 4/2007 | Amand | H04B 1/202 |
| | | | | 341/176 |
| 2009/0121842 | A1* | 5/2009 | Elberbaum | G08C 23/04 |
| | | | | 340/10.5 |
| 2010/0053462 | A1* | 3/2010 | Candelore | H04N 5/4403 |
| | | | | 348/734 |
| 2010/0308664 | A1* | 12/2010 | Face | H05B 47/19 |
| | | | | 307/104 |
| 2011/0298646 | A1* | 12/2011 | Hellemans | H04N 5/4403 |
| | | | | 341/176 |
| 2012/0249890 | A1* | 10/2012 | Chardon | H04N 5/44 |
| | | | | 348/734 |
| 2013/0293361 | A1* | 11/2013 | Posa | G05B 15/02 |
| | | | | 340/12.28 |
| 2015/0054631 | A1* | 2/2015 | Hayes | G08C 17/02 |
| | | | | 340/12.28 |
| 2016/0155324 | A1* | 6/2016 | Gabai | G08C 17/02 |
| | | | | 367/198 |
| 2016/0198536 | A1* | 7/2016 | Britt | H05B 47/19 |
| | | | | 315/149 |
| 2018/0008052 | A1* | 1/2018 | Krickeberg | A61G 13/08 |

FOREIGN PATENT DOCUMENTS

| | | |
|---|---|---|
| CN | 104270518 | 1/2015 |
| CN | 104780470 | 7/2015 |
| CN | 105159104 | 12/2015 |

* cited by examiner

INTELLIGENT TERMINAL REMOTE CONTROLLER-BASED INTERNET-OF-THINGS CONTROL SYSTEM AND CONTROL METHOD

CROSS REFERENCE TO RELATED APPLICATIONS

This application claims the benefit of priority of Chinese Patent Application No. 201510490233.9, filed on Aug. 11, 2015, entitled "Intelligent Terminal Remote Controller-Based Internet-of-Things Control System and Control Method", the entire content of which is incorporated herein by reference. This application is a continuation under 35 U.S.C. § 120 of international patent application PCT/CN2016/092302 filed on Jul. 29, 2016, the content of which is also hereby incorporated by reference.

TECHNICAL FIELD

The present disclosure relates to a control system and control method, and more particularly to, an intelligent terminal remote controller-based internet-of-things control system and control method.

BACKGROUND

Currently, the mobile phone remote controller APP controls an air conditioner and other household electrical appliances by applying one APP version to compatibly control all the electrical appliances. It can only control common commands of the electrical appliances, but it cannot control other electrical appliances of different models having different functions. Or corresponding APP version should be downloaded according to the model. For example, if there are air conditioners with different functions at home, such as a standing air conditioner in the living room and a wall-hanging air conditioner in the bedroom, it is necessary to switch between different remote-control versions in order to control these air conditioners by one remote controller, which is not convenient or practical.

SUMMARY

In view of this, the present disclosure provides an intelligent terminal remote controller-based internet-of-things control system, which is capable of invoking a back-end database through software and making recognition and judgment among the control subjects, so as to solve the problem that remote-control functions are different for different electrical appliances of different models.

To achieve the above object, the present disclosure provides following technical solutions:

An intelligent terminal remote controller-based internet-of-things control system includes at least two household electrical appliance hosts and an intelligent terminal, remote controller software is included in the intelligent terminal and in communication with a model database of the intelligent terminal, the model database is configured to store model number information and information of all functions of various household electrical appliance hosts to be controlled, the household electrical appliance host includes an MCU control chip storing model number information of a current household electrical appliance host, and a control system unit.

In some embodiments, the control system unit is provided with a model code information system storing model code information of a current household electrical appliance host, the model database has the model code information stored therein.

In some embodiments, the model code information includes model information and function information of the current household electrical appliance host.

In some embodiments, the intelligent terminal and the household electrical appliance host are in communication through signals, the signal is an IR (infrared) signal, a RF (radio frequency) signal or a WIFI signal.

The present disclosure further provides an intelligent terminal remote controller-based internet-of-things control method, including steps of:

remotely transmitting a control command to the household electrical appliance host by the remote controller software, and transmitting model number information which is default or set last time, receiving and judging the model number information by the household electrical appliance host.

In some embodiments, when the received model number information is consistent with model number information stored in the MCU control chip, the household electrical appliance host will not return model number information, a remote-control user interface of the remote controller software is maintained as a current interface for the current household electrical appliance host, the current interface allows a user to perform functional operations thereon.

In some embodiments, when the received model number information is not consistent with the model number information stored in the MCU control chip, the household electrical appliance host transmits and returns correct model number information, a remote-control user interface of the remote controller software is adjusted to a remote-control user interface corresponding to the model number information returned.

The present disclosure further provides an intelligent terminal remote controller-based internet-of-things control method, including steps of:

remotely transmitting model code information by the intelligent terminal, acquiring and judging the transmitted the model code information by the household electrical appliance host.

In some embodiments, when the currently acquired model code information is consistent with model code information stored in the model code information system, the remote controller software maintains a current remote-control user interface and a function key, and will not return model code information.

In some embodiments, when the currently acquired model code information is not consistent with model code information stored in the model code information system, the household electrical appliance host returns correct model code information, the remote controller software invokes a user interface for a model of household electrical appliance host according to the correct model code information returned, operations are performed according to a function key on the invoked user interface of the model of household electrical appliance host.

As can be seen from the above technical solutions, the intelligent terminal remote controller-based internet-of-things control system of the present disclosure is capable of invoking a back-end database by software and making recognition and judgment among control subjects, so as to solve the problem that remote-control functions are different for different electrical appliances of different models.

BRIEF DESCRIPTION OF DRAWINGS

In order to illustrate the technical solutions of the embodiments of the present invention or the prior art more clearly, the drawings required for description of the embodiments of the present invention or the prior art are described simply below. Apparently, the drawings described below illustrate only the embodiments of the present invention, those skilled in the art can obtain other drawings without creative work based on the drawings provided.

DETAILED DESCRIPTION OF DISCLOSED EMBODIMENTS

The technical solutions of embodiments of the present invention are described clearly and completely in conjunction with the drawings of embodiments of the present invention. Apparently, the embodiments as described are only part of, not all of the embodiments of the present invention. All of other embodiments obtained without creative work on the basis of the embodiments described herein by those skilled in the art fall into the scope of the present disclosure.

Specifically, the embodiment describes an intelligent terminal remote controller-based internet-of-things control system, configured to control various household electrical appliances via an intelligent terminal in an internet-of-things manner. The embodiment describes a specific control system, taking the control of household air conditioners as an example. Similar control systems can be applied to other household electrical appliances, including but not limited to air conditioner hosts, TV hosts and refrigerator hosts.

Figure 1:
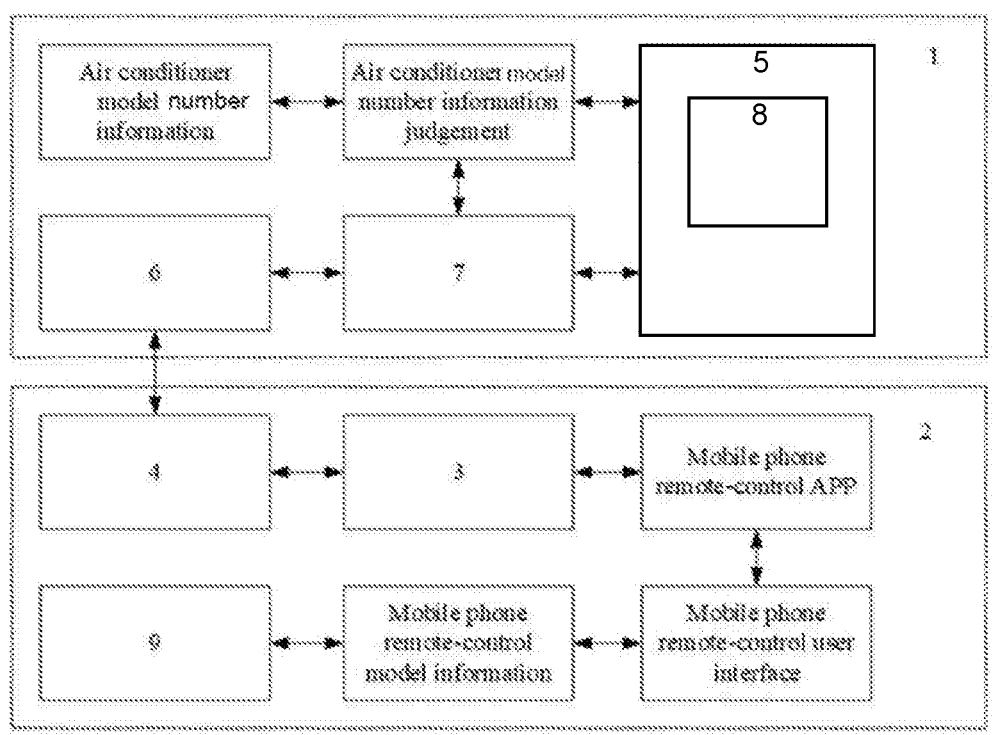
FIG. 1 is a schematic diagram of the intelligent terminal remote controller-based internet-of-things control system according to the present disclosure.

As shown in FIG. 1, the intelligent terminal remote controller-based internet-of-things control system includes at least two air conditioner hosts 1 and an intelligent terminal 2, the intelligent terminal 2 includes an operating system 3 and a remote-control communication unit 4, remote controller software is included in the intelligent terminal 2 and is invoked by the operating system 3 to display a remote-control user interface for different models on the screen of the intelligent terminal 2, a user can operate the corresponding air conditioner host 1 through the remote-control user interface. Furthermore, the remote controller software is in communication with the model database 9 of the intelligent terminal 2, the model database 9 is configured to store model number information of various air conditioner hosts to be controlled.

In the embodiment, the air conditioner host 1 includes a control system unit 5, an air conditioner host communication unit 6 and an MCU control chip 7, the MCU control chip 7 of the air conditioner host 1 stores model number information of the current air conditioner host, the control system unit 5 is provided with a model code information system 8 storing model code information of the current air conditioner host, the model code information includes model information and function information of the current air conditioner host. The intelligent terminal 2 and the air conditioner host 1 are in communication through signals between the remote-control communication unit 4 and the communication unit 6, the signals include an IR signal, a RF signal, a WIFI signal and so on.

The control system described above can be used to control the air conditioner host and other household electrical appliances in an internet-of-things manner. The embodiment describes a specific control method, taking the control of household air conditioners as an example. Similar control systems can be applied to other household electrical appliances, including but not limited to air conditioner hosts, TV hosts or refrigerator hosts. Specifically, the control method includes following steps:

before operating with the remote controller software, firstly, numbering each model of air conditioner in the model database 9 of the intelligent terminal 2 to form and store number information, storing all functions of each model of air conditioner corresponding to different number information as well. Preferably, the model database 9 further stores model code information corresponding to the number information of each model of air conditioner, the model code information includes model information and function information of a respective air conditioner host, the MCU control chip 7 of the air conditioner host 1 stores the number information of the air conditioner host, the model code information system of the air conditioner host 1 stores a model code of the air conditioner host. Common items, such as, turning on, turning off, operating mode, temperature setting adjustment, are displayed on the front page of a remote-control user interface of the remote controller software, other different functions of various models can be adjusted according to the number information of different models, so as to achieve adjustment of all functions for different models.

The control method further includes bi-directionally transmitting and receiving information between the remote controller software and the air conditioner host 1 and controlling the receiving of information, the remote controller software transmitting model number information and pairing, specifically, the remote controller software remotely transmitting a control command, and transmitting model number information which is default or is set last time, the air conditioner host 1 receiving and judging the model number information, if the received model number information is consistent with model number information stored in the MCU control chip 7 of the air conditioner host 1, the air conditioner host 1 will not return model number information to the intelligent terminal 2, the remote-control user interface of the remote controller software is maintained as a current interface for a current air conditioner model, the user can perform function operations on the current interface; if the received model number information is not consistent with model number information stored in the MCU control chip 7 of the air conditioner host 1, the air conditioner host 1 transmits and returns correct model number information to the intelligent terminal 2, the remote-control user interface of the remote controller software is adjusted to a remote-control user interface for the air conditioner corresponding to the model number information returned.

Figure 2:
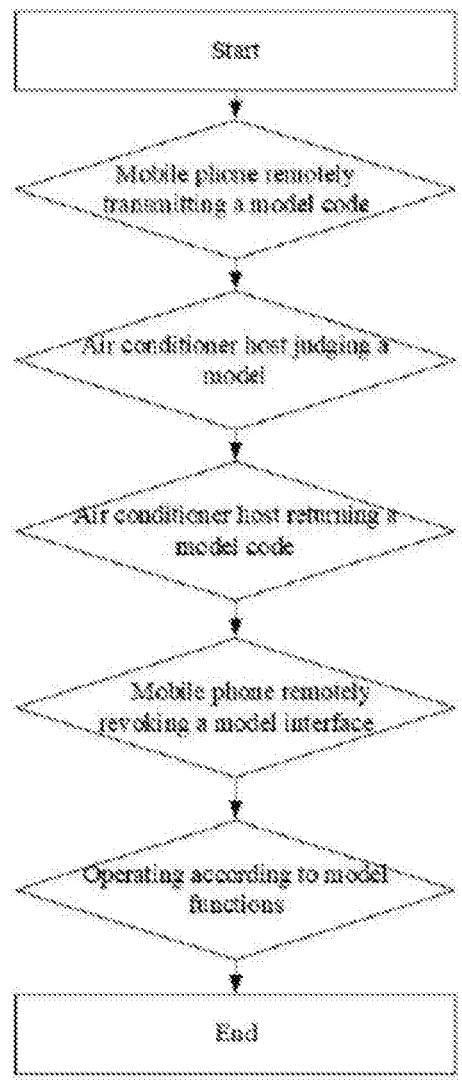
FIG. 2 is a flowchart illustrating the judgement process of the model code information according to the present disclosure.

In another embodiment, the model code information included in the intelligent terminal 2 and the air conditioner host 1 may be directly used for control, instead of transmitting the model number information made by intelligent terminal 2 in the former embodiment. The model code information can be used to recognize the model of the air conditioner to be controlled, and invoke respective function applications corresponding to the model code information. Specifically, as shown in FIG. 2, the control method includes: the intelligent terminal 2 remotely transmitting model code information (S1), the air conditioner host 1 acquiring the transmitted model code information, and judging the currently acquired model code information (S2), if the currently acquired model code information is consistent with model code information stored in the model code information system 8 of the air conditioner host 1, the remote controller software maintains a current remote-control user interface and a function key, without returning model code number information to the intelligent terminal 2; if the currently acquired model code information is not consistent with a model code information stored in the model code information system 8 of the air conditioner host 1, the air conditioner host 1 returns correct model code information to the intelligent terminal 2 (S3), the remote controller software invoking a user interface for the model according to the correct model code information returned (S4), performing operation according to a key for model functions on the invoked user interface (S5).

In other embodiments, after judging and invoking required functions of the air conditioner of the current model, the user can self-define names of air conditioners, such as those in bedrooms, in living rooms, and judge whether the remoted controller by default conducts voice broadcast of the name of a current air conditioner for the first time, the user can select to turn on or turn off the function of voice broadcast of the name and command of air conditioner, the remote controller software also can achieve voice control of air conditioner commands.

The above description of the disclosed embodiments enables those skilled in the art to implement or utilize the present invention. Various amendments to these embodiments are apparent for those skilled in the art, the general principles defined herein can be achieved in other embodiments without departing from the spirit or scope of the present invention. Therefore, the present invention is not limited to these embodiments illustrated herein, but shall accord with the widest scope consistent with the principles and novel characteristics disclosed herein.

What is claimed is:

1. An intelligent terminal remote controller-based internet-of-things control system, comprising at least two household electrical appliance hosts and an intelligent terminal, wherein: (i) remote controller software is included in the intelligent terminal and in communication with a model database of the intelligent terminal, (ii) the remote controller software transmits model number information which is default or was set while the remote controller software last transmitted a control command, (iii) the model database is configured to store model number information and all function information of various household electrical appliance hosts to be controlled, (iv) each household electrical appliance host comprises a Microprogrammed Control Unit (MCU) control chip and a control system unit, and (v) the MCU control chip stores model number information of a corresponding household electrical appliance host, receives and judges the model number information transmitted by the remote controller software, and if the received model number information is inconsistent with the model number information stored in the MCU control chip, the corresponding household electrical appliance host transmits and returns correct model number information consistent with the model number information stored in the MCU control chip, and the remote-control user interface of the remote controller software is adjusted to a remote-control user interface corresponding to the model number information returned.

2. The intelligent terminal remote controller-based internet-of-things control system according to claim 1, wherein the control system unit is provided with a model code information system which comprises a memory for storing model code information of a corresponding household electrical appliance host, and the model database has the model code information stored therein.

3. The intelligent terminal remote controller-based internet-of-things control system according to claim 2, wherein the model code information comprises model information and function information of the corresponding household electrical appliance host.

4. The intelligent terminal remote controller-based internet-of-things control system according to claim 1, wherein the intelligent terminal and each household electrical appliance host are in communication through signals, and the signals are IR signals, RF signals or WIFI signals.

5. A control method for the intelligent terminal remote controller-based internet-of-things control system according to claim 1, the control method comprising the steps:
    remotely transmitting a control command to the at least two household electrical appliance hosts by the remote controller software included in the intelligent terminal, and transmitting the model number information which is default or was set while the remote controller software last transmitted a control command, wherein the model number information and all function information of the various household electrical appliance hosts are stored in the model database of the intelligent terminal; and
    each household electrical appliance host receiving and judging the model number information, such that when the received model number information is inconsistent with model number information stored in the MCU control chip of the corresponding household electrical appliance host, the corresponding household electrical appliance host transmits and returns correct model number information consistent with the model number information stored in the MCU control chip, and the remote-control user interface of the remote controller software is adjusted to a remote-control user interface corresponding to the model number information returned.

6. The control method according to claim 5, wherein, when the received model number information is consistent with the model number information stored in the MCU control chip, the corresponding household electrical appliance host, will not return the correct model number information, the remote-control user interface of the remote controller software is maintained as the current interface for the corresponding household electrical appliance host, and the current interface allows a user to perform function operations thereon.

7. A control method for the intelligent terminal remote controller-based internet-of-things control system according to claim 2, the control method comprising the steps:
    remotely transmitting model code information to the at least two household electrical appliance hosts by the remote controller software included in the intelligent terminal; and
    the corresponding household electrical appliance host acquiring and judging the transmitted model code information such that when the currently acquired model code information is dot consistent with the model code information stored in the model code information system, the household electrical appliance host returns correct model code information consistent with the model code information stored in the model code information system, the remote controller software invokes a user interface for a model of the corresponding household electrical appliance host according to the correct model code information returned, and operations are performed according to a function key on the invoked user interface of the model of the corresponding household electrical appliance host.

8. The control method according to claim 7, wherein, when currently acquired model code information is consistent with model code information stored in the model code information system, the remote controller software maintains a current remote-control user interface and a function key, and a corresponding household electrical appliance host does not return model code information.

9. The intelligent terminal remote controller-based internet-of-things control system according to claim 2, wherein the intelligent terminal and the corresponding household electrical appliance host are in communication through signals, and the signals are IR signals, RF signals or WIFI signals.

10. The intelligent terminal remote controller-based internet-of-things control system according to claim 3, wherein the intelligent terminal and the corresponding household electrical appliance host are in communication through signals, and the signals are IR signals, RF signals or WIFI signals.

* * * * *